United States Patent
Li et al.

(10) Patent No.: US 11,662,582 B2
(45) Date of Patent: May 30, 2023

(54) DISPLAY WITH HOLOGRAPHIC RELAY AND HOLOGRAPHIC IMAGE COMBINER

(71) Applicant: Meta Platforms Technologies, LLC, Menlo Park, CA (US)

(72) Inventors: Gang Li, Seattle, WA (US); Yang Zhao, Kirkland, WA (US); Changwon Jang, Bellevue, WA (US); Weichuan Gao, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 373 days.

(21) Appl. No.: 16/996,398

(22) Filed: Aug. 18, 2020

(65) Prior Publication Data

US 2021/0191125 A1 Jun. 24, 2021

Related U.S. Application Data

(60) Provisional application No. 62/950,724, filed on Dec. 19, 2019.

(51) Int. Cl.
| | | |
|---|---|---|
| G02B 27/01 | (2006.01) | |
| G02B 5/32 | (2006.01) | |
| G03H 1/22 | (2006.01) | |

(52) U.S. Cl.
CPC .......... *G02B 27/0172* (2013.01); *G02B 5/32* (2013.01); *G03H 1/2205* (2013.01); *G02B 2027/0174* (2013.01); *G02B 2027/0178* (2013.01); *G03H 2001/2231* (2013.01)

(58) Field of Classification Search
None
See application file for complete search history.

(56) References Cited

U.S. PATENT DOCUMENTS

| | | |
|---|---|---|
| 5,071,210 A | 10/1991 | Arnold et al. |
| 5,164,848 A | 11/1992 | Firth et al. |
| 2019/0025588 A1* | 1/2019 | Osterhout ............ H04N 13/383 |
| 2019/0285897 A1 | 9/2019 | Topliss et al. |

FOREIGN PATENT DOCUMENTS

| | | |
|---|---|---|
| EP | 0943934 | 9/1999 |
| JP | 2017058400 | 3/2017 |

OTHER PUBLICATIONS

PCT/US2020/061716 Search Report dated Feb. 19, 2021.
International Preliminary Report on Patentability for International Application No. PCT/US2020/061716, dated Jun. 30, 2022, 9 pages.
https://www.rpcphotonics.com/engineered-diffusers-infonnation/ Website page printed Aug. 18, 2020.

* cited by examiner

*Primary Examiner* — Jennifer D. Carruth
(74) *Attorney, Agent, or Firm* — Pequignot + Myers; Matthew A. Pequignot

(57) ABSTRACT

A display device includes an image source, a holographic relay, and a holographic image combiner in an off-axis configuration. The holographic relay may include a pair of freeform holographic reflectors relaying light of the image source to an intermediate image plane. The holographic image combiner receives and redirects the relayed light from the holographic relay, forming an image in angular domain at an eyebox of the display device, the image in angular domain corresponding to the image in linear domain generated by the image source.

17 Claims, 11 Drawing Sheets

DISPLAY WITH HOLOGRAPHIC RELAY AND HOLOGRAPHIC IMAGE COMBINER

REFERENCE TO RELATED APPLICATION

The present application claims priority from U.S. Provisional Patent Application No. 62/950,724 entitled "Display with Holographic Elements", filed on Dec. 19, 2019, and incorporated herein by reference in its entirety.

TECHNICAL FIELD

The present disclosure relates to visual displays, and in particular to near-eye displays and methods for displaying images to a user.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

BRIEF DESCRIPTION OF THE DRAWINGS

Exemplary embodiments will now be described in conjunction with the drawings, in which.

DETAILED DESCRIPTION

Figure 1:
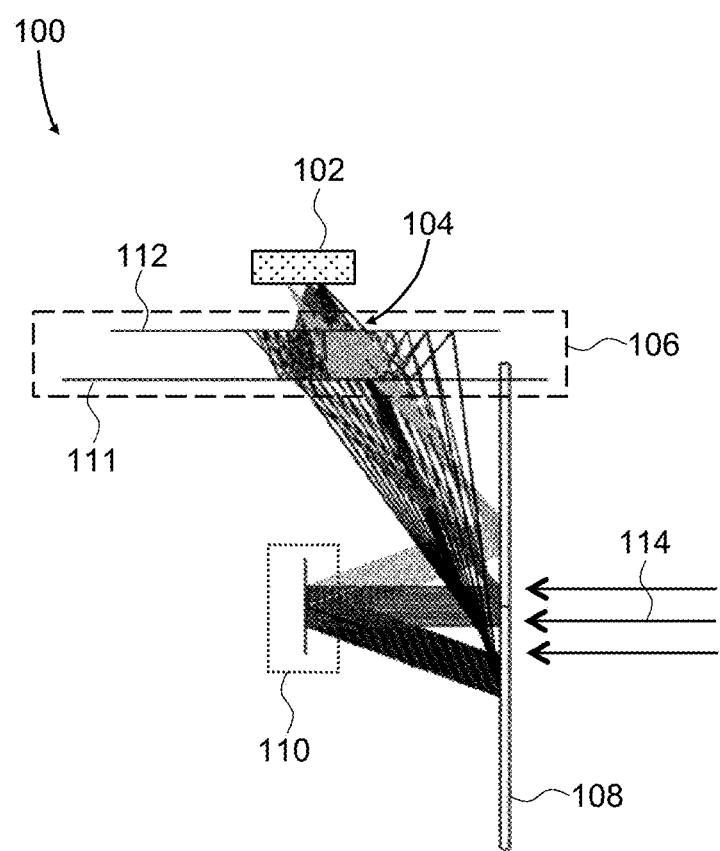
FIG. 1 is a ray-traced top view of a display device of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 2, 3, 4A-4B, 5A-5D, 6A-6D, and FIGS. 8 to 12, similar reference numerals denote similar elements.

A display device of this disclosure includes several holographic optical elements (HOEs) that perform the function of redirecting image light emitted by an image source towards an eyebox of the display and expanding the image light over the eyebox of the display for convenience of viewing, in a compact off-axis configuration. Herein, the term "eyebox" means a geometrical area where an image of acceptable quality may be presented to a user.

HOEs may be configured to redirect light beams propagating within a specific range of ray angles, to perform a desired function of focusing, collimation, aberration correction, and the like. Freeform HOEs can be constructed with a great degree of flexibility, enabling the redirection of light rays at large angles of incidence while correcting for aberrations of these highly oblique rays. Several freeform HOEs may be disposed and configured to provide high numerical aperture collimation with low aberrations in a very compact footprint. Herein, the term "freeform" refers to an element having no translational or rotational symmetry about axes normal to the mean plane of the element. Typically, freeform optical elements are configured to operate in an off-axis geometry, i.e. to redirect, focus, defocus, collimate, etc. off-axis light beams.

In accordance with the present disclosure, there is provided a display device comprising an image source for providing light carrying an image in linear domain, a holographic relay coupled to the image source for relaying the light provided by the image source, and a holographic image combiner coupled to the holographic relay for receiving and redirecting the relayed light from the holographic relay, so as to form an image in angular domain at an eyebox of the display device, the image in angular domain corresponding to the image in linear domain. The holographic image combiner may include a freeform reflective holographic element for reflecting the relayed light while propagating external light through the holographic image combiner to enable a simultaneous observation of outside environment and the image provided by the image source. The image source may include a screen and a projector for projecting the light onto the screen to form the image in linear domain on the screen. The screen may include a holographic diffuser. The holographic relay may relay the light to an intermediate image surface disposed between the holographic relay and the holographic image combiner.

In some embodiments, the holographic relay comprises first and second reflective holographic optical elements, which may be freeform holographic optical elements configured for operation with skewed light rays. An angle of incidence of a chief ray onto the holographic image combiner may be greater than 60 degrees w.r.t. normal to a surface of the holographic image combiner. The first reflective holographic optical element may be configured to receive the light from the image source and reflect the light towards the second reflective holographic optical element. The second reflective holographic optical element may be configured to receive the light from the first reflective holographic optical element and reflect the light towards the holographic image combiner. In operation, the light from the image source may propagate to the first reflective holographic optical element through the second reflective holographic optical element. The light reflected from the second reflective holographic optical element may propagate through the first reflective holographic optical element on its path to the holographic image combiner.

In some embodiments, the holographic relay comprises a first transparent substrate having first and second opposed surfaces supporting the first and second reflective holographic optical elements respectively. The holographic relay may further include a second transparent substrate having third and fourth opposed surfaces, and third and fourth reflective holographic optical elements supported by the third and fourth surfaces respectively. In operation, the light reflected by the second reflective holographic optical element may propagate through the fourth reflective holographic optical element before impinging onto the third reflective holographic optical element, to be reflected thereby to impinge onto the fourth reflective holographic optical element, and to be reflected thereby to propagate through the third reflective holographic optical element towards the holographic image combiner.

In accordance with the present disclosure, there is provided a near-eye display comprising a frame for wearing on a user's head. First and second image sources are supported by the frame, for providing light to left and right eyes of the user, respectively, the light carrying images in linear domain for the left and right eyes of the user respectively. First and second holographic relays are supported by the frame and coupled to the respective first and second image sources, for relaying the light provided by the respective first and second image sources. First and second holographic image combiners are supported by the frame and coupled to the respective first and second holographic relays, for receiving and redirecting the relayed light from the respective first and second holographic relays, so as to form images in angular domain for observation by the left and right eyes respectively, corresponding to the images in linear domain for the left and right eyes respectively.

In some embodiments, each one of the first and second holographic relays comprises a pair of optically coupled reflective freeform holographic optical elements. In some embodiments, the first and second holographic image combiners each comprise a freeform holographic element configured to propagate external light therethrough while reflecting the light carrying the image in angular domain, to enable a simultaneous observation of outside environment and the image provided by the image source. Angles of incidence of chief rays onto the first and second holographic image combiners may be greater than 60 degrees w.r.t. normals to surfaces of the first and second holographic image combiners, respectively.

In accordance with the present disclosure, there is further provided a method for displaying an image to a user. The method includes projecting an image in linear domain onto a screen, relaying light diffusely reflected from the screen using a holographic relay, and redirecting the light relayed by the holographic relay using a holographic image combiner, so as to form an image in angular domain at an eyebox of a display, the image in angular domain corresponding to the image in linear domain. The relaying may include redirecting the diffusely reflected light by a pair of freeform holographic optical elements. The method may further include propagating external light through the holographic image combiner for simultaneous observation of outside environment and the image in angular domain.

Referring now to FIG. 1, a display device 100 includes an image source 102 for providing light 104 carrying an image in linear domain. Herein, the term "image in linear domain" means an actual displayed image such as, for example, an image on a flat or curved screen projected by a projector, an image displayed by a display panel such as a computer monitor or a TV set, and the like. A holographic relay 106 is optically coupled to the image source 102. The holographic relay 106 is configured to relay an image provided by the image source 102 to an intermediate image plane or a curved intermediate image surface, while at least partially correcting for various optical aberrations, particularly optical aberrations related to the off-axis geometry of light propagation. The intermediate plane/surface may be disposed between the holographic relay and the holographic image combiner. Herein, the term "intermediate image plane" or "intermediate image surface" relates to an imaginary plane or surface where a real or a virtual image may be formed.

A holographic image combiner 108 is optically coupled to the holographic relay 106, and is configured for receiving and redirecting the light 104 relayed by the holographic relay 106, so as to form an image in angular domain at an eyebox 110 of the display device 100. The holographic image combiner 108 may also perform a function of aberrations correction. The image in angular domain at the eyebox 110 corresponds to the image in linear domain formed by the image source 102.

In the embodiment shown, the holographic relay 106 includes first 111 and second 112 freeform HOEs operating in reflection. The first HOE 111 is optically coupled to the image source 102 for redirecting the light 104 while compensating for optical aberrations due to off-axis impinging light 104. The second HOE 112 is optically coupled to the first HOE 111 for receiving the light 104 from the first HOE 111 and redirecting the light 104 and, optionally, further compensating off-axis optical aberrations. The holographic image combiner 108 may include a freeform HOE configured to transmit external light 114 through the freeform HOE while reflecting the light 104, thereby providing the capability of simultaneous observation of outside environment and the image provided by the image source 102 by the user. In other words, the image combiner 108 may be configured to enable the viewing of outside environment through the image combiner 108, while observing the imagery displayed by the display 100. The holographic image combiner 108 therefore functions as a multiplexor of the light 104 emitted by the image source 102 and external light 114 from the outside environment.

The first 111 and second 112 HOEs may be disposed parallel to each other, and the holographic image combiner 108 may be disposed perpendicular to the first 111 and second 112 HOEs, as shown in FIG. 1. Alternatively, the first HOE 111 and the second HOE 112 may be disposed at acute or obtuse angles w.r.t. each other. The HOEs 111,112 may operate by reflective diffraction as shown. The HOEs 111, 112, and/or the image combiner 108 may be configured for highly off-axis propagation of the light 104, i.e. at incidence angles of chief rays greater than 30 degrees; greater than 60 degrees; greater than 75 degrees; and even greater than 80 degrees w.r.t. normal to a surface of a corresponding HOE. Herein, the term "chief ray" means a main or central ray of a fan of rays emitted by a particular pixel of the image source 102. In the optical configuration of the display device 100, chief rays are highly skewed.

The function of the HOEs 111,112 is to relay the image provided by the image source 102 while compensating for optical aberrations resulting from the highly off-axis optical configuration of the display device 100. Together with the holographic image combiner 108, the first 111 and second 112 HOEs to convert the image in linear domain displayed by the image source 102 into an image in angular domain at an eyebox 110 for direct observation by the user. It is noted that for light beams outside of the operational angular ranges of the holograms of the HOEs 111,112 and the holographic image combiner 108, these optical elements function as transparent glass plates having no focusing or defocusing power, although a small amount of unwanted light scattering on the holograms might occur in dense holograms.

Figure 2:
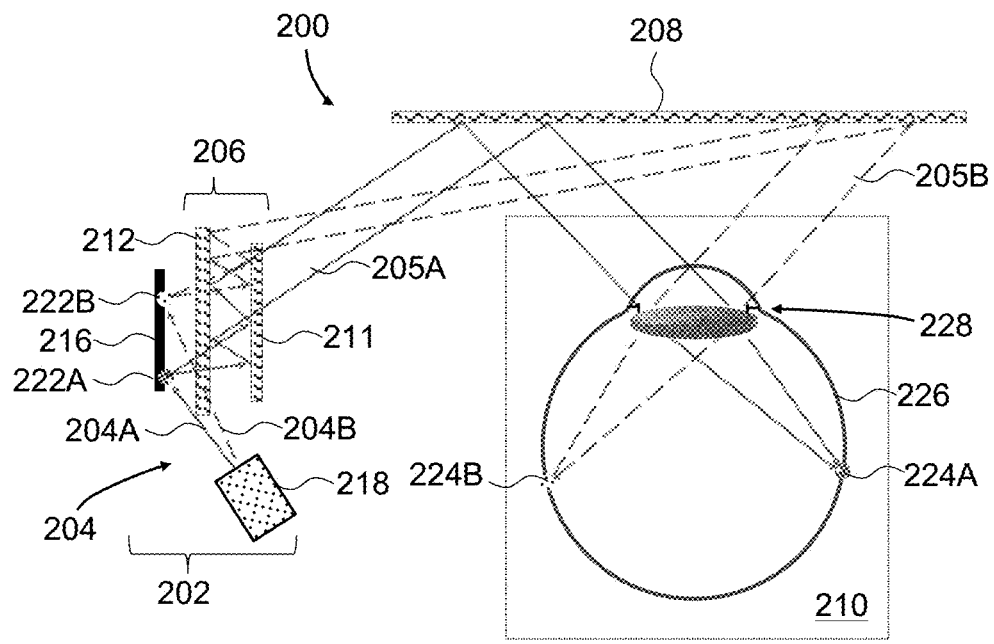
FIG. 2 is a top view of a display device with a projector forming an image in linear domain on a screen.

Referring to FIG. 2, a display device 200 is an embodiment of the display device 100 of FIG. 1, including similar elements as the display device 100. An image source 202 of the display device 200 of FIG. 2 includes a screen 216 coupled to a projector 218. The function of the screen 216 is to scatter light emitted by the projector 218. A holographic diffuser or an engineered diffuser including an array of micro-optic elements may be used for that purpose. One advantage of a holographic diffuser or engineered diffuser is the ability to control the scattering angular distribution, i.e. to scatter impinging light into a pre-defined cone of angles. The screen 216 may be flat or curved.

In operation, the projector 218 projects light 204 onto the screen 216, forming an image in linear domain on the screen 216. A holographic relay 206 is optically coupled to the screen 216. In the embodiment shown, the holographic relay 206 includes first 211 and second 212 reflective freeform HOEs disposed optically in sequence and configured to at least partially correct for optical aberrations while relaying the projected image to an intermediate image surface.

A holographic image combiner 208 is optically coupled to the holographic relay 206. The holographic image combiner 208 may include a hologram configured to receive and redirect the light 204 relayed by the holographic relay 206, forming an image in angular domain at an eyebox 210 of the display device 200, while optionally further correcting optical aberrations. The image in angular domain at an eye's 226 pupil 228 corresponds to the image in linear domain formed by the image source 202.

Projection of two image pixels A and B (pixels themselves not shown) will be considered for illustration of image formation. A first ray of light 204A, shown in a solid line, represents pixel A, and a second ray of light 204B, shown in a dashed line, represents pixel B of the image to be displayed. The first 204A and second 204B rays are chief rays of corresponding converging light beams (not shown for brevity) that are being focused onto the screen 216. The first ray 204A impinges onto the screen 216 at a first location 222A, and the second ray 204B impinges onto the screen 216 at a second location 222B. At each location, the screen 216 scatters the emitted light 204. A light cone scattered at the first location 222A is redirected by the holographic relay 206, forming a first beam 205A. A light cone scattered at the second location 222B is redirected by the holographic relay 206, forming a second beam 205B. The first 205A and second 205B beams are then redirected by the holographic image combiner 208 to propagate through the eye's 226 pupil 228. The first 205A and second 205B beams get focused by the eye 226 at respective first 224A and second 224B locations on the eye's 226 retina. It is noted that the second ray of light 204B may propagate through the second freeform holographic reflector 212 before impinging onto the screen 216 substantially without being redirected by the second freeform holographic reflector 212, since the hologram of the second freeform holographic reflector 212 is configured to only redirect light beams propagating within a certain pre-defined operational range of incidence angles.

Figure 3:
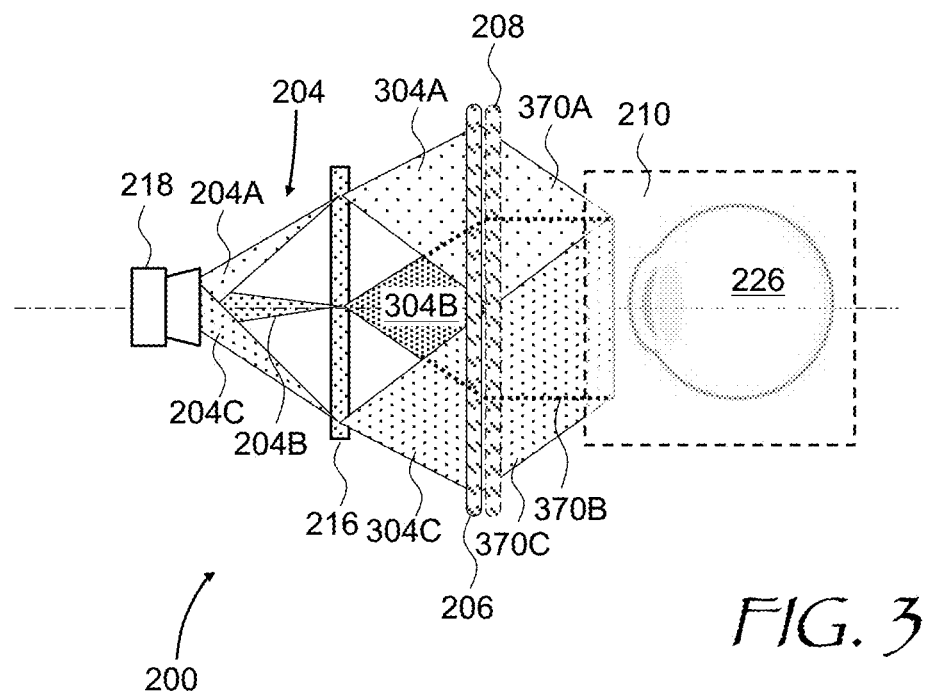
FIG. 3 is a schematic unfolded view of the display of FIG. 2, illustrating a principle of operation of the display.

The function of the display device 200 of FIG. 2 is further illustrated in FIG. 3, where the optical path of the display device 200 is unfolded, and the reflective HOEs are unfolded, i.e. are shown in an on-axis transmission configuration, for ease of following the paths of light rays. The projector 218 projects the light 204 carrying an image to be displayed onto the screen 216, which scatters the light 204. The holographic relay 206 receives the light scattered by the screen 216, and conveys the light to the holographic image combiner 208, which redirects the light to the eyebox 210.

The image formation is illustrated in FIG. 3 by presenting optical paths of three converging beams of light, 204A, 204B, and 204C, which correspond to three different pixels of an image to be displayed by the display 200, one central pixel and two edge pixels. The three converging beams of light 204A, 204B, and 204C each converge at a focal point at the screen 216, each focal point corresponding to a pixel of the image to be displayed. The screen 216 scatters the light 204 at the three focal points into respective diverging cones of light 304A, 304B, and 304C. Preferably, the pre-defined range of angles of the diverging cones of light 304A, 304B, and 304C is wider, e.g. at least two times wider, three times wider, five times wider, or even ten times wider, than the cone angles of the respective converging beams of light 204A, 204B, and 204C emitted by the projector 218 and converging to the corresponding single pixels of the image projected onto the screen 216. The widening of the scattered light cones increases etendue of the display 200, enabling wide FOV and large eyebox at the same time.

The diverging cones of light 304A, 304B, and 304C are collimated by the combination of the holographic relay 206 and the holographic image combiner 208 into nearly-collimated light beams 370A, 370B, and 370C respectively, all converging to an exit pupil at the eyebox 210. One, two, or more holographic elements may be provided in the holographic relay 206. Two elements perform the image relaying and aberration correction functions better than one element, resulting in a cleaner final image. A pixel of an image in angular domain at the eyebox 210 is represented by a unique beam angle of a nearly collimated beam (e.g. the nearly collimated light beams 370A, 370B, 370C) at the eyebox 210. The entire plurality of such beams, at different beam angles, defines the whole image in angular domain. It is to be noted that the nearly-collimated light beams 370A, 370B, and 370C are widened due to the scattering of light by the screen 216, increasing the exit pupil size and potentially stretching the exit pupil over the entire eyebox 210. At the same time, the wide FOV is preserved. It is further noted that the on-axis configuration of FIG. 3 is shown for ease of following the paths of light beams, and the actual display device typically has a highly off-axis configuration, with chief rays impinging onto holographic optical elements at angles to normals to these optical elements exceeding 30 degrees; 45 degrees; 60 degrees; or even 75 degrees in some cases.

Figure 4A:
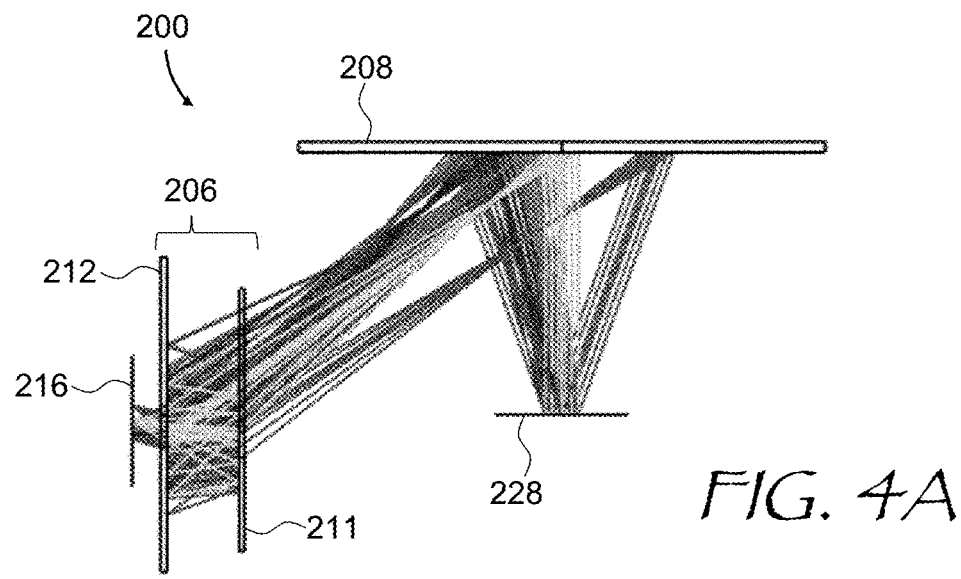
FIG. 4A is a top ray-traced view of the display of FIG. 2.
Figure 4B:
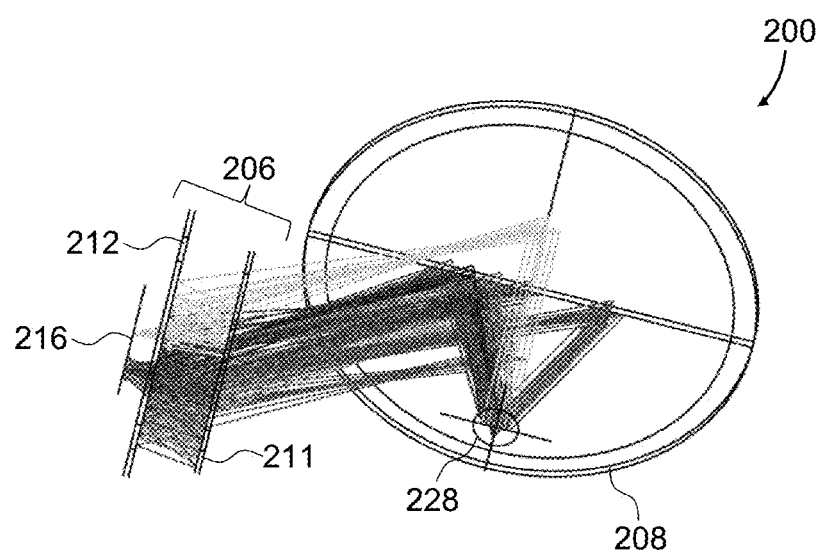
FIG. 4B is a 3D ray-traced view of the display of FIG. 2.

FIGS. 4A and 4B illustrate actual ray-traced optical paths of light in the display device 200 of FIG. 2, as modeled by optical design software. The traced light rays begin at the screen 216. One can see that the folded beam path afforded by the holographic angular selectivity of the freeform HOEs, along with the capability of freeform HOEs to handle skewed rays, results in a very compact overall configuration. FIG. 4A is a top view of a display portion providing images to the left eye of the user. The projector (not shown in FIG. 4A) and the holographic relay 206 may be disposed proximate temporal area of the user's head. For the right eye of the user, the display configuration may be mirrored, with the projector-relay assembly being disposed on the right temporal area of the user's head.

The beam propagation in the display 200 of FIG. 2 is further illustrated in FIGS. 5A-5D and 6A-6D. Rectangles 500A, 500B, 500C, and 500D in FIGS. 5A, 5B, 5C, and 5D denote different portions of the folded optical path of light from the screen 216 to the eyebox 228. These portions of the optical path are illustrated respectively in FIGS. 6A, 6B, 6C, and 6D, as follows.

Figure 5A:
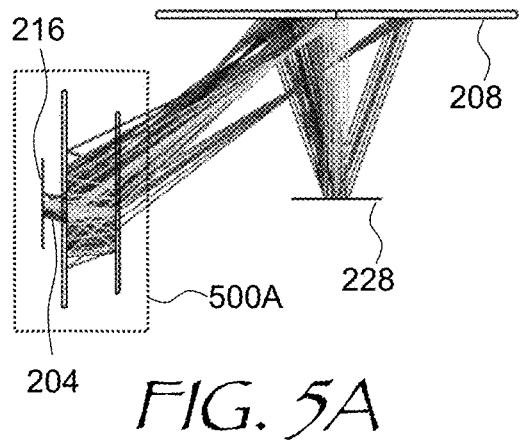
FIGS. 5A to 5D are ray-traced views of the display of FIG. 2 highlighting different portions of an optical path of the light from the screen to the eyebox.
Figure 6A:
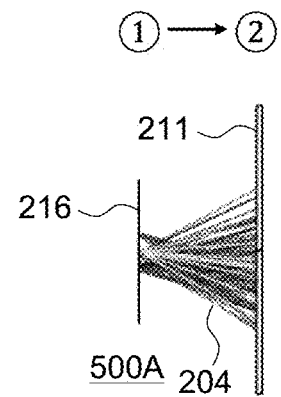
FIGS. 6A to 6D are corresponding ray-traced views of the optical path portions of FIGS. 5A to 5D.

FIGS. 5A and 6A illustrate a first portion 500A of the optical path from the screen 216 to the first reflective freeform HOE 211. The direction of the first portion 500A of the optical path is denoted with circled digits 1→2 in FIG. 6A. The first reflective freeform HOE 211 is configured to receive the light 204 from the screen 216 illuminated by the projector 218 (not shown in FIGS. 5A and 6A). The light 204 from the projector 218 propagates to the first reflective freeform HOE 211 through the second reflective freeform HOE 212.

Figure 5B:
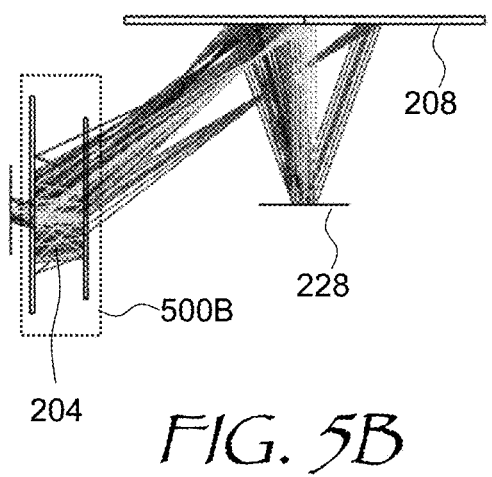
Figure 6B:
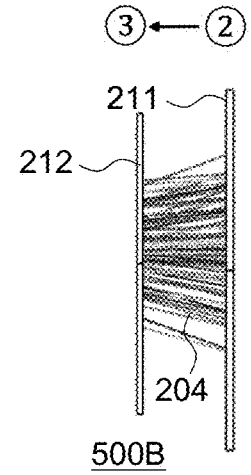

FIGS. 5B and 6B illustrate a second portion 500B of the optical path from the first reflective freeform HOE 211 to the second reflective freeform HOE 212. The direction of the second portion 500B of the optical path is denoted with circled digits 2→3 in FIG. 6B. The first reflective freeform HOE 211 is configured reflect the light 204 towards the second reflective freeform HOE 212.

Figure 5C:
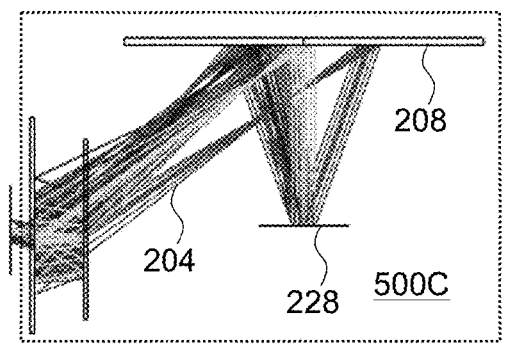
Figure 6C:
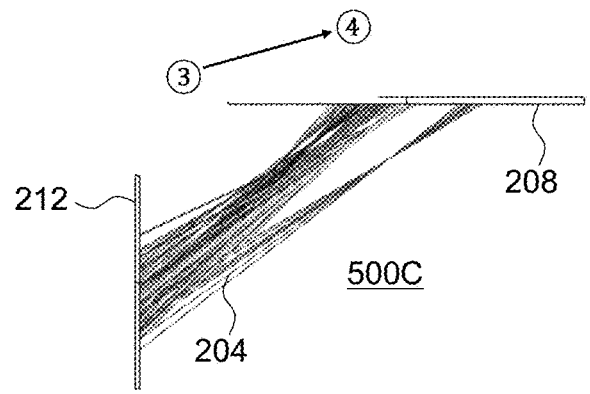

FIGS. 5C and 6C illustrate a third portion 500C of the optical path from the second reflective freeform HOE 212 to the holographic combiner 208. The direction of the third portion 500C of the optical path is denoted with circled digits 3→4 in FIG. 6C. The second reflective freeform HOE 212 is configured to receive the light 204 from the first reflective freeform HOE 211 and reflect the light 204 towards the holographic image combiner 208. The light 204 reflected from the second reflective freeform HOE 212 propagates through the first reflective freeform HOE 211 on its path to the holographic combiner 208, at oblique angles of incidence onto the holographic relay 206 of greater than 30 degrees, or in some cases greater than 60 degrees w.r.t. a normal to a surface of the holographic combiner 208.

Figure 5D:
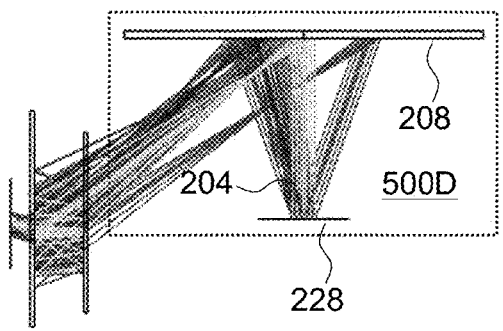
Figure 6D:
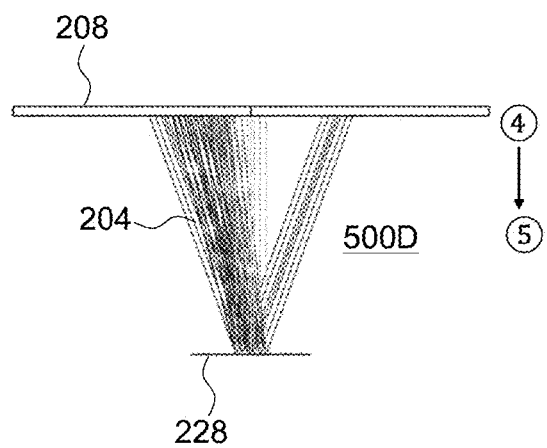

Finally, FIGS. 5D and 6D illustrate a fourth portion 500D of the optical path. The direction of the fourth portion 500D of the optical path is denoted with circled digits 4→5 in FIG. 6D. The fourth portion 500D extends from the holographic combiner 208 to the eye pupil 228.

Figure 7A:
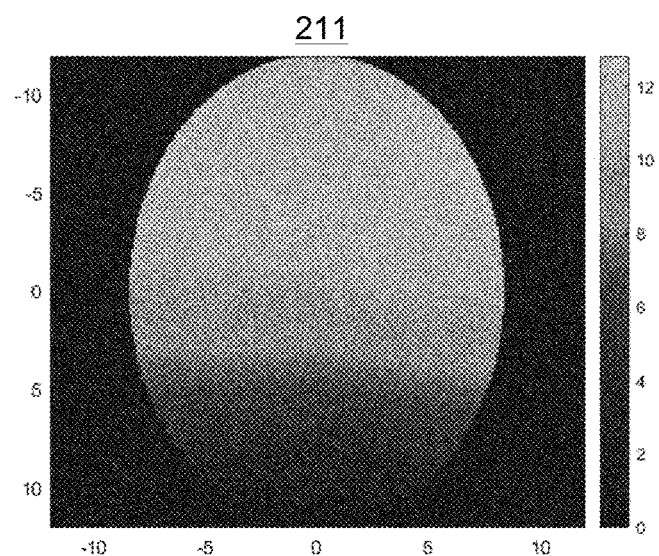
FIGS. 7A to 7C are heat maps of optical phase delays of different freeform holographic elements of the display of FIG. 2.
Figure 7B:
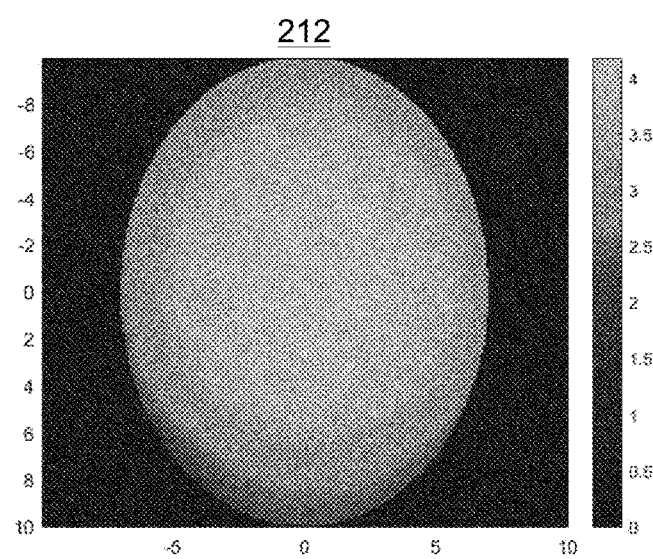
Figure 7C:
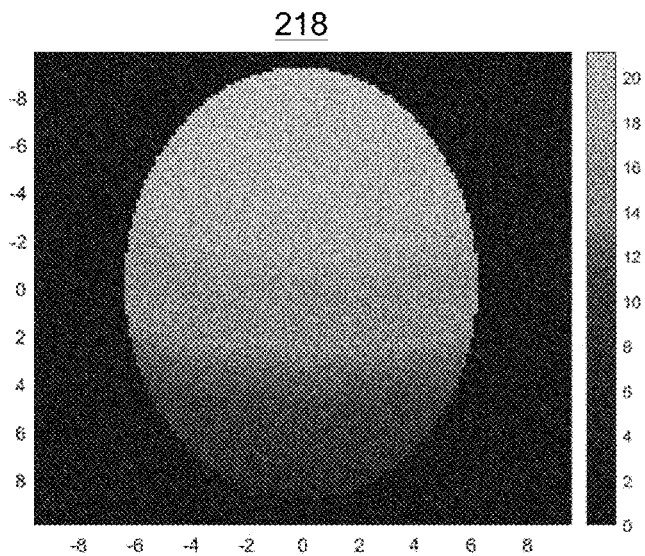

FIGS. 7A to 7C show example wavefront maps of the first reflective freeform HOE 211 (FIG. 7A), the second reflective freeform HOE 212 (FIG. 7B), and the holographic combiner 208 (FIG. 7C). The function of the first reflective freeform HOE 211 is to diffract the image light to the second reflective freeform HOE 212, and also to compensate for optical aberrations. The function of the second reflective freeform HOE 212 is to diffract the image light to the holographic combiner 208, and also to compensate for optical aberrations. The function of the holographic combiner 208 is to converge the rays of the image light to the eyebox 210, and also to further compensate optical aberrations. The compensation of optical aberrations by all three holographic HOEs makes highly oblique optical configurations possible. Despite highly oblique angles of incidence of chief rays onto HOEs, a good-quality image in angular domain at the eyebox 210 may be obtained.

Figure 8:
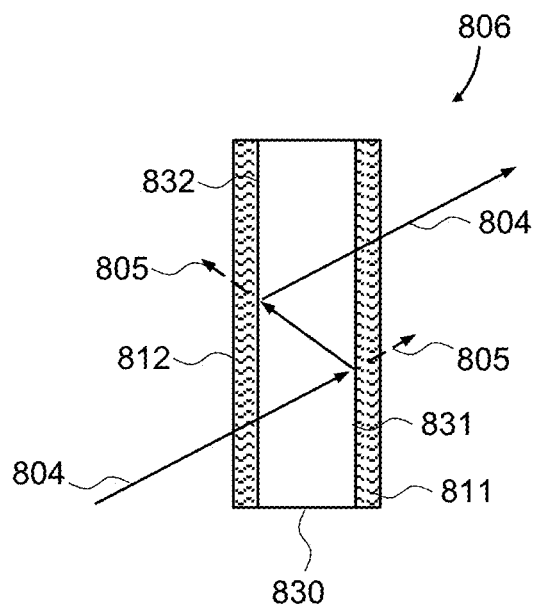
FIG. 8 is an embodiment of a holographic relay for a display device including a pair of reflective holographic elements supported by a lightguide.

Referring to FIG. 8, a holographic relay 806 may be used in the display device 200 instead of the holographic relay 206 of FIG. 2. The holographic relay 806 of FIG. 8 includes a transparent substrate, or a lightguide, 830 having first 831 and second 832 opposed surfaces, e.g. a glass plate. The first 831 and second 832 opposed surfaces support first 811 and second 812 reflective HOEs respectively. Their function is similar to that of corresponding first 211 and second 212 reflective freeform HOEs.

In some embodiments, the angles of incidence of impinging light 804 from inside the transparent substrate 830 can be selected so as to fulfill a total internal reflection (TIR) condition at the first 831 and/or second 832 surfaces of the transparent substrate 830. The first 811 and second 812 reflective HOEs may be be index matched to the transparent substrate 830, and the angles of diffraction by the first 811 and second 812 reflective HOEs may be larger than TIR angles to avoid light leaking. One advantage of the TIR configuration is that residual light 805 that is not reflected by the first 811 and second 812 reflective HOEs does not escape the holographic relay 806, and accordingly does not contribute to ghost image formation. Corresponding in- and out-couplers, not shown, may be provided for coupling the light 804 in and out of the transparent substrate 830.

Figure 9:
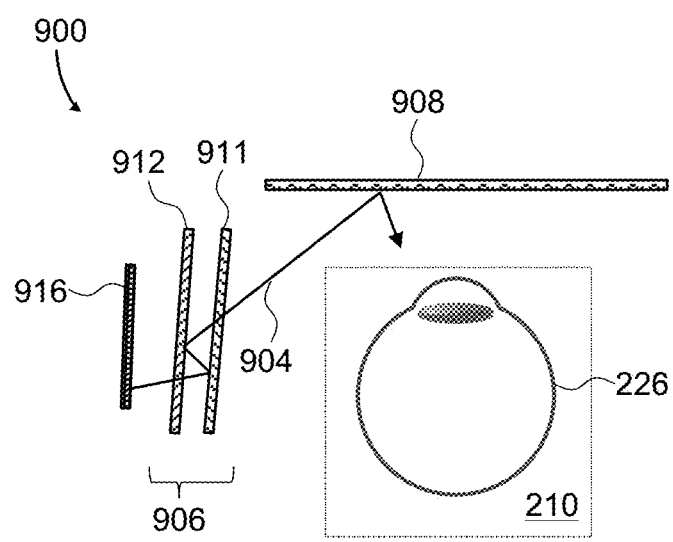
FIG. 9 is a top schematic view of a display device with tilted freeform holographic elements.

Turning to FIG. 9, a display device 900 is similar to the display device 200 of FIG. 2, and includes similar elements performing similar functions. A holographic relay 906 of the display device 900 of FIG. 9 includes reflective freeform HOEs 911, 912 that are tilted relative to each other. A screen 916 of the display device 900 may also be tilted relative to the reflective freeform HOEs 911, 912. Tilt angles of the reflective freeform HOEs 911, 912 and the screen 916 may be all different from one another. The reflective freeform HOEs 911, 912 and the screen 916 may be non-perpendicular to a holographic combiner 908. Tilting of the reflective freeform HOEs 911, 912 and/or the screen 916 may facilitate further aberrations reduction.

In operation, light 904 scattered by a screen 916 and carrying an image to be displayed propagates through the second reflective freeform HOE 912 substantially without being redirected, impinges onto the first reflective freeform HOE 911, is reflected towards the second reflective freeform HOE 912, which reflects the light 904 through the first reflective freeform HOE 911 towards the holographic image combiner 908. The holographic image combiner 908 redirects the light 904 towards the eyebox 210.

Figure 10:
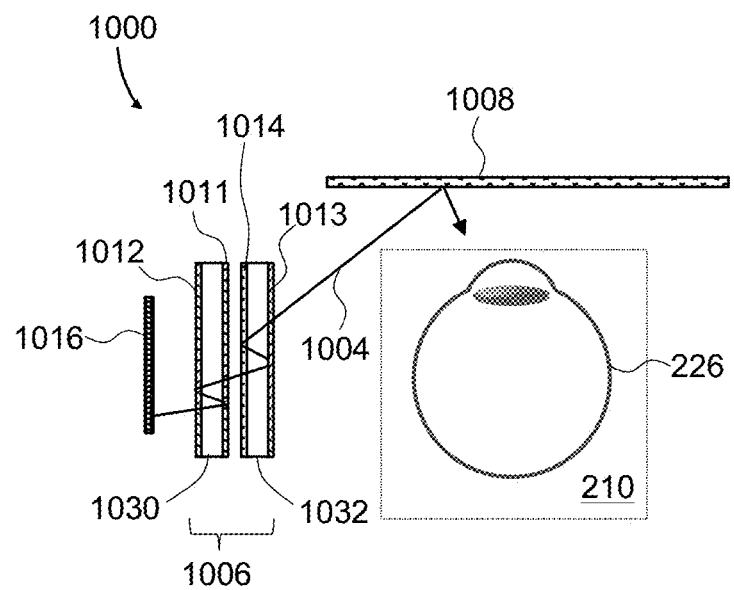
FIG. 10 is a top schematic view of a display device with four freeform holographic elements supported by a pair of lightguides.

Referring now to FIG. 10, a display device 1000 is similar to the display device 200 of FIG. 2, and includes similar elements performing similar functions. A holographic relay 1006 of the display device 1000 of FIG. 10 includes a first transparent substrate or lightguide 1030 supporting first 1011 and second 1012 reflective freeform HOEs on its opposed surfaces, and a second transparent substrate or lightguide 1032 supporting third 1013 and fourth 1014 reflective freeform HOEs on its opposed surfaces.

In operation, light 1004 scattered by a screen 1016 and carrying an image to be displayed propagates through the second reflective freeform HOE 1012 substantially without being redirected, impinges onto the first reflective freeform HOE 1011, is reflected towards the second reflective freeform HOE 1012, which reflects the light 1004 through the reflective freeform HOE 1011 to propagate through the fourth reflective freeform HOE 1014 before impinging onto the third reflective freeform HOE 1013, is reflected by the third reflective freeform HOE 1013 to impinge onto the fourth reflective freeform HOE 1014, and is reflected by the fourth reflective freeform HOE to propagate through the third reflective freeform HOE 1013 towards the holographic image combiner 1008.

Figure 11:
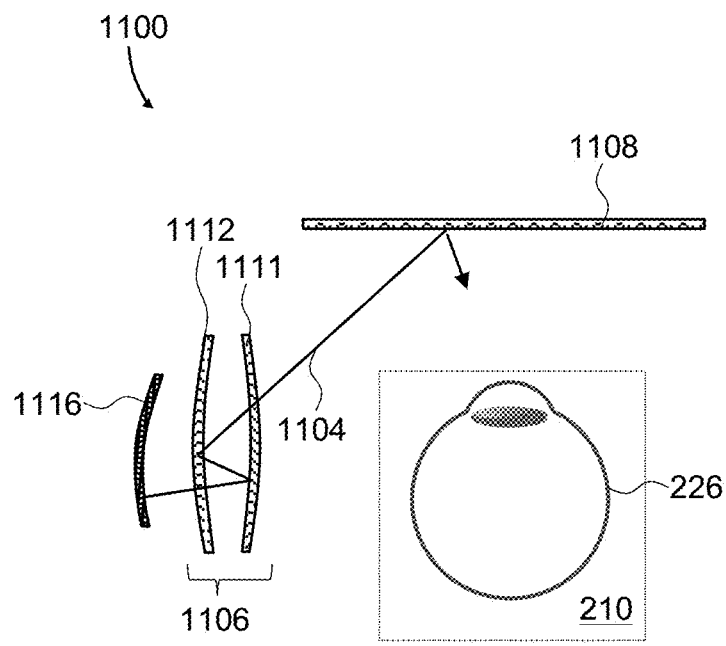
FIG. 11 is a top schematic view of a display device with curved freeform holographic elements.

Referring now to FIG. 11, a display device 1100 is similar to the display device 200 of FIG. 2, and includes similar elements performing similar functions. A holographic relay 1106 of the display device 1100 of FIG. 11 includes curved reflective freeform HOEs 1111, 1112. A screen 1116 of the display device 1100 may also be curved. Radiate of curvature of the reflective freeform HOEs 1111, 1112 and the screen 1116 may be all different from one another. Curving of the reflective freeform HOEs 1111, 1112 and/or the screen 1116 may facilitate further aberrations reduction.

In operation, light 1104 scattered by a screen 1116 carrying an image to be displayed propagates through the second reflective freeform HOE 1112 substantially without being redirected, impinges onto the first reflective freeform HOE 1111, is reflected towards the second reflective freeform HOE 1112, which reflects the light 1104 to propagate through the first reflective freeform HOE 1111 substantially without redirection towards the holographic image combiner 1108. The holographic image combiner 1108 redirects the light towards the eyebox 210.

Figure 12:
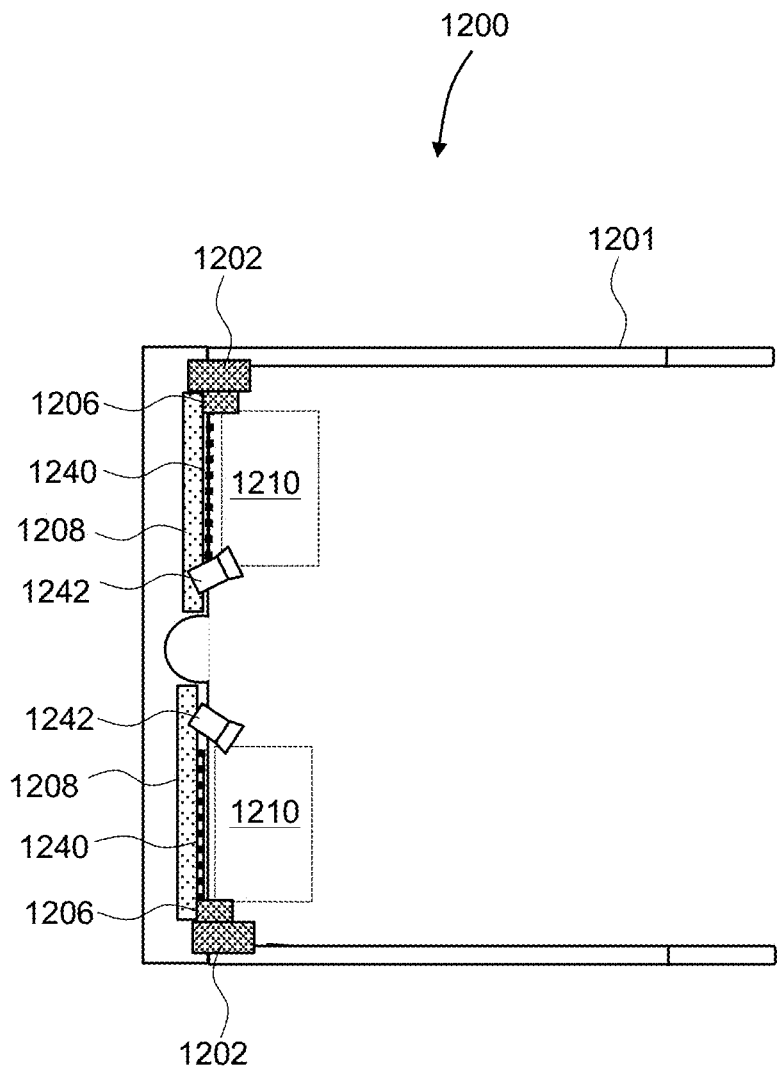
FIG. 12 is a view of a near-eye display of this disclosure having a form factor of a pair of eyeglasses.

Turning to FIG. 12, a near-eye display 1200 includes a frame 1201 having a form factor of a pair of eyeglasses for wearing on a user's head. Image sources 1202 are supported by the frame 1201 for providing light carrying images in linear domain to the left eye and the right eye of the user. Holographic relays 1206 supported by the frame 1201 are coupled to the respective image sources 1202 for redirecting the image light provided by the respective first and second image sources, while correcting or lessening off-axis optical aberrations. Holographic image combiners 1208 supported by the frame 1201 are coupled to the respective holographic relays 1206 for receiving and redirecting the light from the respective holographic relays 1206, so as to form images in angular domain for observation by the user's eyes, while further correcting for optical aberrations. The images in angular domain correspond to the images in linear domain provided by the image sources 1202.

The frame 1201 may also support an eye-tracking camera 1242, one for each eye. Illuminators 1240 may be disposed on the holographic image combiners 1208 for illuminating the eyes with invisible light, e.g. infrared light. The eye-tracking cameras 1242 may be made selectively sensitive to such light.

The configuration and function of the display components for each eye is similar to that of the display devices considered above with reference to FIGS. 1 to 6 and 9 to 11. In other words, the near-eye display 1200 includes a pair of display devices of FIGS. 1 to 6 and 9 to 11, one for each eye. Each holographic relay 1206 may include a pair of optically coupled reflective freeform HOEs redirecting light as illustrated in FIGS. 2, 5A-5D, 6A-6D, and 8 to 11. The holographic image combiners 1208 may each include a freeform HOE configured to transmit external light while reflecting the image light carrying the image in angular domain, to enable a simultaneous observation of outside environment and the image provided by the image sources 1202. A highly oblique optical configuration, e.g. when angles of incidence of chief rays onto the corresponding holographic image combiners 1208 is greater than 30 degrees, 45, degrees, 60 degrees, and even 75 degrees w.r.t. normals to the surfaces of the corresponding optical elements, is afforded by the combined aberration-compensation capability of multiples HOEs used.

Among the advantages of the near-eye display 1200 compared to waveguide type displays and retinal projection type displays are the lack of rainbow effect and low light efficiency due to image-replicating lightguides. The etendue of the near-eye display 1200 may be significant due to utilization of diffusive screens. No mechanical movement is required to trace the eye movement, which results in a lower overall power consumption. The HOEs may be made of a photopolymerizable photopolymer, and may be freeform HOEs as explained above.

The purpose of the eye-tracking cameras 1242 is to determine position and/or orientation of both eyes of the user. Once the position and orientation of the user's eyes are known, the eye pupil positions are known, a controller of the near-eye display 1200 may compute the required images to display to the user. A gaze convergence distance and direction may also be determined. The imagery displayed may be adjusted dynamically to account for the user's gaze, for a better fidelity of immersion of the user into the displayed augmented reality, and/or to provide specific functions of interaction with the displayed augmented reality.

In operation, the eye illuminators 1240 illuminate the eyes at the corresponding eyeboxes 1210, to enable the eye-tracking cameras 1242 to obtain the images of the eyes, as well as to provide reference reflections termed glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1210. The display's 1200 controller may then process images obtained by the eye-tracking cameras 1242 to determine, in real time, the eye gazing directions of both eyes of the user.

Figure 13:
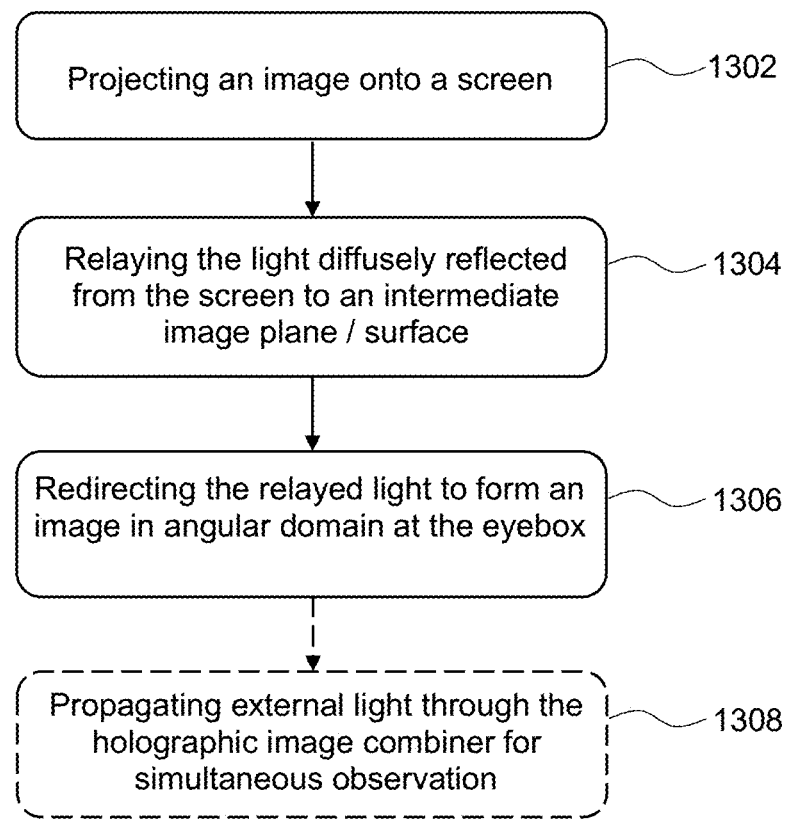
FIG. 13 is a flowchart of a method for displaying an image to a user.

Turning to FIG. 13 with further reference to FIG. 2, a method 1300 for displaying an image to a user includes projecting (FIG. 13; 1302) an image in linear domain onto a screen (e.g. FIG. 2; 216). Light diffusely reflected from the screen is relayed (FIG. 13; 1304) by a holographic relay (e.g. FIG. 2; 206). The light relayed by the holographic relay is redirected (FIG. 13; 1306) using a holographic image combiner (e.g. FIG. 2; 208) so as to form an image in angular domain at an eyebox of the display. The image in angular domain corresponds to the image in linear domain. The method 1300 further includes an optional step of propagating (FIG. 13; 1308) external light through the holographic image combiner (e.g. FIG. 2; 208) for simultaneous observation of outside environment and the image in angular domain generated by the display. The light/image relaying step 1304 of FIG. 13 may include redirecting the diffusely reflected light by a pair of freeform reflective HOEs, e.g. the first 211 and second 212 reflective HOEs of the display device 200 of FIG. 2.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 14:
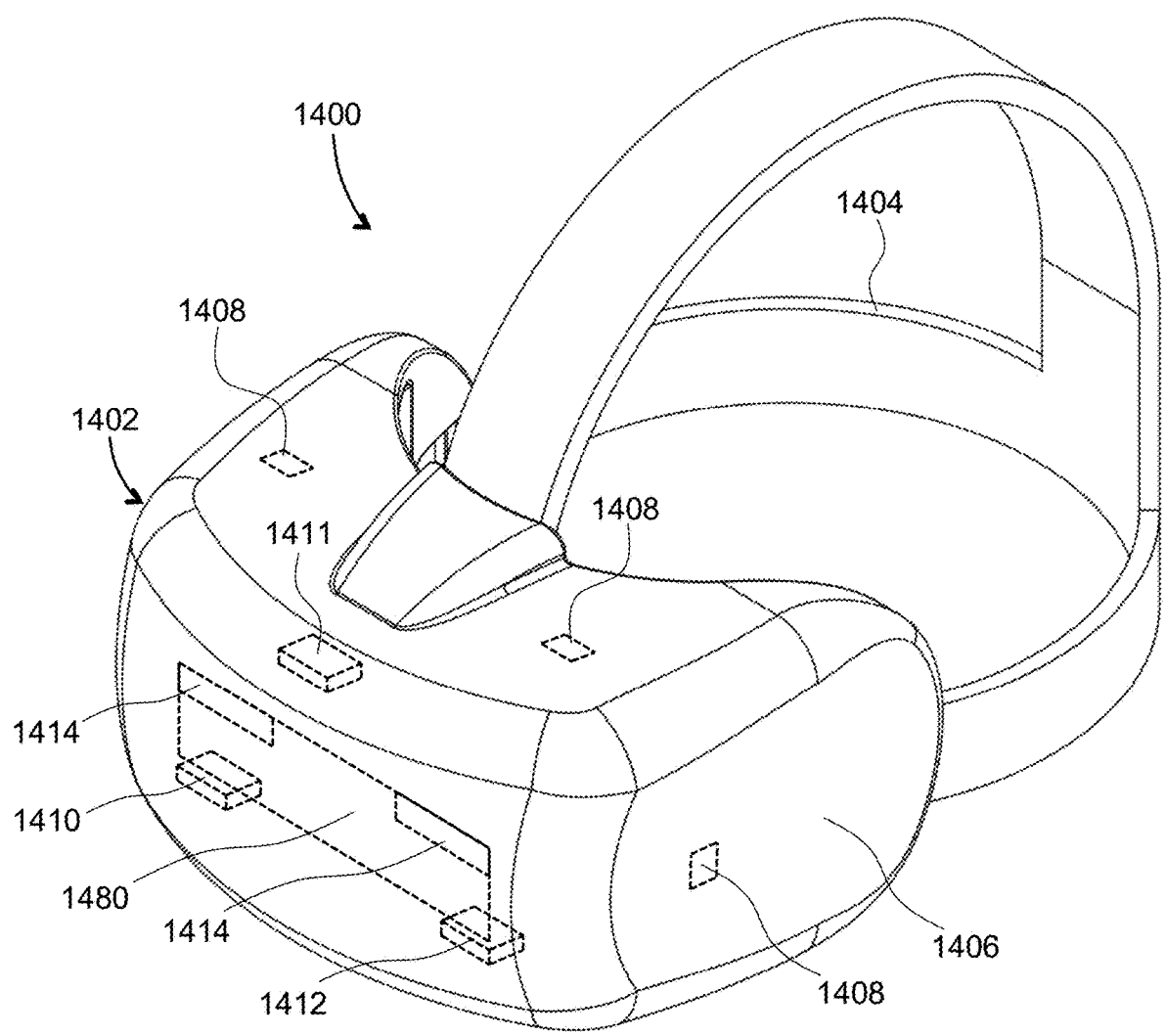
FIG. 14 is an isometric view of a head-mounted display of this disclosure.

Referring to FIG. 14, an HMD 1400 is an example of an AR/VR wearable display system which encloses the user's face, for a greater degree of immersion into the AR/VR environment. The HMD 1400 may include any of the display devices disclosed herein, including the display device 100 of FIG. 1 and the display device 200 of FIG. 2, for example. The function of the HMD 1400 is to augment views of a physical, real-world environment with computer-generated imagery, or to generate the entirely virtual 3D imagery. The HMD 1400 may include a front body 1402 and a band 1404. The front body 1402 is configured for placement in front of eyes of a user in a reliable and comfortable manner, and the band 1404 may be stretched to secure the front body 1402 on the user's head. A display system 1480 may be disposed in the front body 1402 for presenting AR/VR imagery to the user. Sides 1406 of the front body 1402 may be opaque or transparent.

In some embodiments, the front body 1402 includes locators 1408 and an inertial measurement unit (IMU) 1410 for tracking acceleration of the HMD 1400, and position sensors 1412 for tracking position of the HMD 1400. The IMU 1410 is an electronic device that generates data indicating a position of the HMD 1400 based on measurement signals received from one or more of position sensors 1412, which generate one or more measurement signals in response to motion of the HMD 1400. Examples of position sensors 1412 include: one or more accelerometers, one or more gyroscopes, one or more magnetometers, another suitable type of sensor that detects motion, a type of sensor used for error correction of the IMU 1410, or some combination thereof. The position sensors 1412 may be located external to the IMU 1410, internal to the IMU 1410, or some combination thereof.

The locators 1408 are traced by an external imaging device of a virtual reality system, such that the virtual reality system can track the location and orientation of the entire HMD 1400. Information generated by the IMU 1410 and the position sensors 1412 may be compared with the position and orientation obtained by tracking the locators 1408, for improved tracking accuracy of position and orientation of the HMD 1400. Accurate position and orientation is important for presenting appropriate virtual scenery to the user as the latter moves and turns in 3D space.

The HMD 1400 may further include a depth camera assembly (DCA) 1411, which captures data describing depth information of a local area surrounding some or all of the HMD 1400. To that end, the DCA 1411 may include a laser radar (LIDAR), or a similar device. The depth information may be compared with the information from the IMU 1410, for better accuracy of determination of position and orientation of the HMD 1400 in 3D space.

The HMD 1400 may further include an eye tracking system 1414 for determining orientation and position of user's eyes in real time. The obtained position and orientation of the eyes also allows the HMD 1400 to determine the gaze direction of the user and to adjust the image generated by the display system 1480 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1402.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display device comprising:
an image source for providing light carrying an image in linear domain;
a holographic relay coupled to the image source for relaying the light provided by the image source; and
a holographic image combiner coupled to the holographic relay for receiving and redirecting the relayed light from the holographic relay, so as to form an image in angular domain at an eyebox of the display device, the image in angular domain corresponding to the image in linear domain;
wherein the holographic image combiner comprises a freeform reflective holographic element for reflecting the relayed light while propagating external light through the holographic image combiner to enable a simultaneous observation of outside environment and the image provided by the image source.

2. The display device of claim 1, wherein the image source comprises:
a screen; and
a projector for projecting the light onto the screen to form the image in linear domain on the screen.

3. A display device comprising:
an image source for providing light carrying an image in linear domain;
a holographic relay coupled to the image source for relaying the light provided by the image source; and
a holographic image combiner coupled to the holographic relay for receiving and redirecting the relayed light from the holographic relay, so as to form an image in angular domain at an eyebox of the display device, the image in angular domain corresponding to the image in linear domain;
wherein the image source comprises:
a holographic diffuser; and
a projector for projecting the light onto the holographic diffuser to form the image in linear domain on the holographic diffuser.

4. A display device comprising:
an image source for providing light carrying an image in linear domain;
a holographic relay coupled to the image source for relaying the light provided by the image source; and
a holographic image combiner coupled to the holographic relay for receiving and redirecting the relayed light from the holographic relay, so as to form an image in angular domain at an eyebox of the display device, the image in angular domain corresponding to the image in linear domain;
wherein the holographic relay relays the light to an intermediate image surface disposed between the holographic relay and the holographic image combiner.

5. A display device comprising:
an image source for providing light carrying an image in linear domain;
a holographic relay coupled to the image source for relaying the light provided by the image source; and
a holographic image combiner coupled to the holographic relay for receiving and redirecting the relayed light from the holographic relay, so as to form an image in angular domain at an eyebox of the display device, the image in angular domain corresponding to the image in linear domain;
wherein the holographic relay comprises first and second reflective holographic optical elements.

6. The display device of claim 5, wherein the first and second reflective holographic optical elements are freeform holographic optical elements configured for operation with skewed light rays.

7. The display device of claim 5, wherein an angle of incidence of a chief ray onto the holographic image combiner is greater than 60 degrees with respect to normal to a surface of the holographic image combiner.

8. The display device of claim 5, wherein:
the first reflective holographic optical element is configured to receive the light from the image source and reflect the light towards the second reflective holographic optical element; and
the second reflective holographic optical element is configured to receive the light from the first reflective holographic optical element and reflect the light towards the holographic image combiner.

9. The display device of claim 8, wherein in operation, the light from the image source propagates to the first reflective holographic optical element through the second reflective holographic optical element.

10. The display device of claim 9, wherein in operation, the light reflected from the second reflective holographic optical element propagates through the first reflective holographic optical element on its path to the holographic image combiner.

11. The display device of claim 8, wherein the holographic relay comprises a first transparent substrate having first and second opposed surfaces supporting the first and second reflective holographic optical elements respectively.

12. The display device of claim 11, wherein the holographic relay further comprises:
a second transparent substrate having third and fourth opposed surfaces; and
third and fourth reflective holographic optical elements supported by the third and fourth surfaces respectively;
wherein in operation, the light reflected by the second reflective holographic optical element propagates through the fourth reflective holographic optical element before impinging onto the third reflective holographic optical element, is reflected thereby to impinge onto the fourth reflective holographic optical element, and is reflected thereby to propagate through the third reflective holographic optical element towards the holographic image combiner.

13. A near-eye display comprising:
a frame for wearing on a user's head;
first and second image sources supported by the frame, for providing light to left and right eyes of the user, respectively, the light carrying images in linear domain for the left and right eyes of the user respectively;
first and second holographic relays supported by the frame and coupled to the respective first and second image sources, for relaying the light provided by the respective first and second image sources; and
first and second holographic image combiners supported by the frame and coupled to the respective first and second holographic relays, for receiving and redirecting the relayed light from the respective first and second holographic relays, so as to form images in angular domain for observation by the left and right eyes respectively, corresponding to the images in linear domain for the left and right eyes respectively;

wherein each one of the first and second holographic relays comprises a pair of optically coupled reflective freeform holographic optical elements.

14. A near-eye display comprising:
a frame for wearing on a user's head;
first and second image sources supported by the frame, for providing light to left and right eyes of the user, respectively, the light carrying images in linear domain for the left and right eyes of the user respectively;
first and second holographic relays supported by the frame and coupled to the respective first and second image sources, for relaying the light provided by the respective first and second image sources; and
first and second holographic image combiners supported by the frame and coupled to the respective first and second holographic relays, for receiving and redirecting the relayed light from the respective first and second holographic relays, so as to form images in angular domain for observation by the left and right eyes respectively, corresponding to the images in linear domain for the left and right eyes respectively;
wherein the first and second holographic image combiners each comprise a freeform holographic element configured to propagate external light therethrough while reflecting the light carrying the image in angular domain, to enable a simultaneous observation of outside environment and the image provided by the image source.

15. The near-eye display of claim 14, wherein angles of incidence of chief rays onto the first and second holographic image combiners are greater than 60 degrees with respect to normal to surfaces of the first and second holographic image combiners, respectively.

16. A method for displaying an image to a user, the method comprising:
projecting an image in linear domain onto a screen;
relaying light diffusely reflected from the screen using a holographic relay; and
redirecting the light relayed by the holographic relay using a holographic image combiner, so as to form an image in angular domain at an eyebox of a display, the image in angular domain corresponding to the image in linear domain;
wherein the relaying includes redirecting the diffusely reflected light by a pair of freeform holographic optical elements.

17. The method of claim 16, further comprising propagating external light through the holographic image combiner for simultaneous observation of outside environment and the image in angular domain.

* * * * *